March 29, 1966 T. W. CARVER 3,243,802
VEHICLE NAVIGATION TO DESTINATION SYSTEM
Filed Oct. 2, 1962 8 Sheets-Sheet 1

INVENTOR.
THURMAN W. CARVER
BY
ATTORNEYS

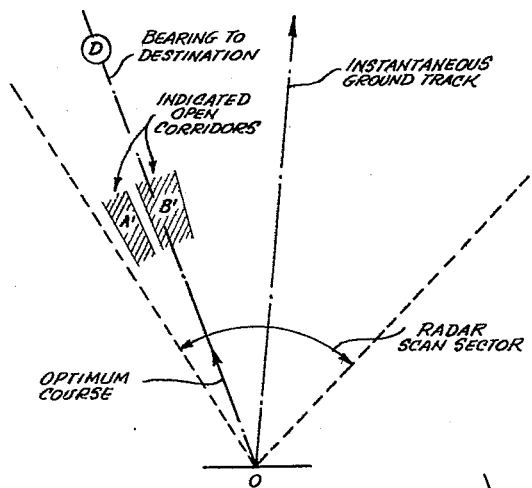
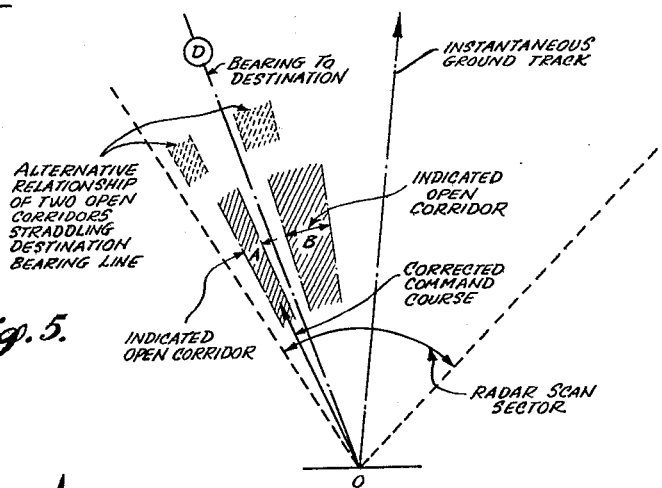
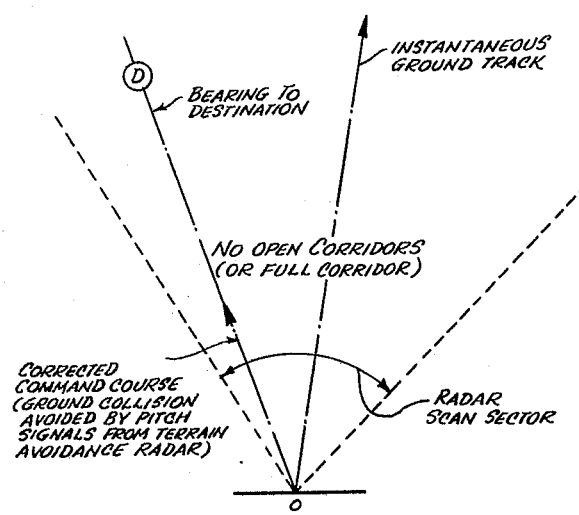

March 29, 1966 T. W. CARVER 3,243,802
VEHICLE NAVIGATION TO DESTINATION SYSTEM
Filed Oct. 2, 1962 8 Sheets-Sheet 5

INVENTOR.
THURMAN W. CARVER
BY
Reynolds & Christensen
ATTORNEYS

March 29, 1966  T. W. CARVER  3,243,802
VEHICLE NAVIGATION TO DESTINATION SYSTEM
Filed Oct. 2, 1962  8 Sheets-Sheet 7

INVENTOR.
THURMAN W. CARVER
BY
Reynolds & Christensen
ATTORNEYS

March 29, 1966      T. W. CARVER      3,243,802

VEHICLE NAVIGATION TO DESTINATION SYSTEM

Filed Oct. 2, 1962      8 Sheets-Sheet 8

STEERING COMMAND GENERATOR - 36

INVENTOR.
THURMAN W. CARVER
BY
Reynolds & Christensen
ATTORNEYS

United States Patent Office 3,243,802
Patented Mar. 29, 1966

3,243,802
VEHICLE NAVIGATION TO DESTINATION
SYSTEM
Thurman W. Carver, Scottsdale, Ariz., assignor to The
Boeing Company, Seattle, Wash., a corporation of
Delaware
Filed Oct. 2, 1962, Ser. No. 227,892
19 Claims. (Cl. 343—7)

This invention relates to a system for navigating vehicles (usually in azimuth) around obstacles along the shortest navigable route to a point of destination, and is particularly applicable to high-speed airplanes operating at low altitudes. The invention is herein illustratively described by reference to its presently preferred embodiment; however, it will be recognized that certain modifications and variations therein may be employed without departing from the essential features involved.

In the present navigation system as herein disclosed a radar or other obstacle detection device scans the region immediately ahead of the vehicle to detect the presence and relative bearing of obstacles and thereby the relative bearing of passable or open corridors through which the vehicle may navigate. At the same time, a navigation computer provides instantaneous bearing to the point of destination. An optimum corridor selector accepts the two sets of data and on the basis thereof controls operation of a steering signal generator.

An object of this invention is to devise a blind flight navigation system of this nature which permits safe navigation of high-performance airplanes flying at low altitudes to a destination point along the shortest available route.

While systems have been developed heretofore displaying terrain avoidance information on cathode ray tube indicators, these were complicated by the necessity for a three dimensional display and the necessity for pilot interpretation thereof. More recently, radar circuits have been developed which automatically control pitch maneuvers in accordance with terrain clearance requirements along the aircraft ground track. It is an object of this invention to provide terrain avoidance control in azimuth so as to minimize or eliminate pitch maneuvers. By so doing, the invention furthers the original purpose of flying the airplane as close to the ground as possible, namely, avoidance of detection. In addition, the invention extends the low altitude capability of an aircraft having a pitch control terrain avoidance system by providing maneuverability in more than one plane.

A further object hereof is to achieve the described results in a system capable of using known and reliable components and which is fully compatible with related navigation and control equipment currently used in airplanes. It will be recognized, however, that the invention may be used in other vehicles where similar navigation problems may exist.

A further object hereof is to devise a system of the character described which generates steering control signals or commands substantially continuously by providing cyclic computations in a logic system accepting information of relative bearing to destination and relative bearings of open corridors. Further, the steering information is developed without ambiguity as to choice of immediate route and with priority to an open corridor along the bearing to destination, but, if this is closed, then along the corridor nearest bearing to destination.

Still another object is to provide a means by which obstacles beyond a predetermined range, yet which may be within the detection range of the radar, are ignored or rejected by the logic system in determining immediate navigation route. As a result, an open corridor is not unnecessarily rejected by the presence of a distant terrain prominence in alignment with the corridor and within the radar beam. Distant prominences may prove not to be obstacles, of course, either due to the fact that as the aircraft draws nearer to them they may not be sufficiently proximate to the aircraft's route to destination, or due to the fact that height or a distant promience may prove to be insufficient to present an obstacle when detected by the radar at closer range (i.e., where it subtends a lesser angle in terms of radar beam width vertically).

Cyclic scanning of the region ahead by the aircraft's radar produces scan position gates which begin and end with the opposite angular limits of detected open corridors as determined by the absence of echo signals occurring within an established range interval. Instantaneous antenna scan position at each of these gate limits is converted into a quantity compared continuously with relative bearing to the distination point as derived from navigational computer means, and coincidence of the two is detected. If at the instant of such coincidence an open corridor gate is being generated, a signal will be transmitted to the steering command generator which selects actual bearing to destination as the steering signal produced by the system. If, on the other hand, the corridor is closed along the line of bearing to destination, the system selects as optimum corridor the open corridor nearest bearing to destination. This it does by a process, executed during each scan cycle, of (1) storing instantaneous antenna position at the termination of the last corridor detected preceding said point of coincidence, (2) measuring the scan angle or time lapse between such point of termination and such point of coincidence, (3) detecting antenna position at initiation of the next succeeding open corridor after the coincidence point, and (4) measuring time lapse from such coincidence point to such point of initiation. Thereafter the respective time lapses are compared and the shortest selected, and with it the related antenna position. The latter therefore necessarily corresponds to bearing of the safe corridor nearest to alignment with bearing to destination. On the basis of this choice the system generates its steering command signal.

These and other features, objects and advantages of the invention will become more fully evident from the following description of the preferred embodiment as depicted in the accompanying drawings.

FIGURES 4, 5 and 6 are scan sector diagrams illustrating representative navigation conditions encountered with the system.

Figure 1:
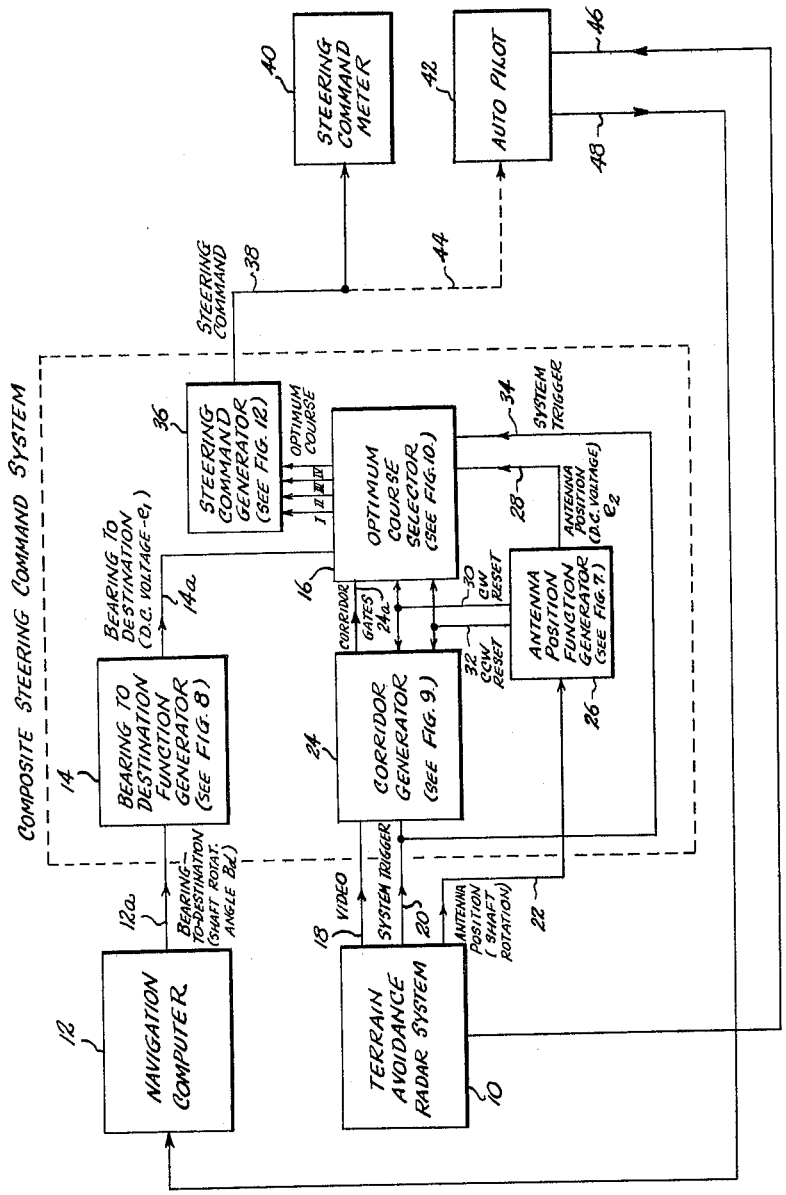
FIGURE 1 is a generalized block diagram of the disclosed embodiment.
Figure 2:
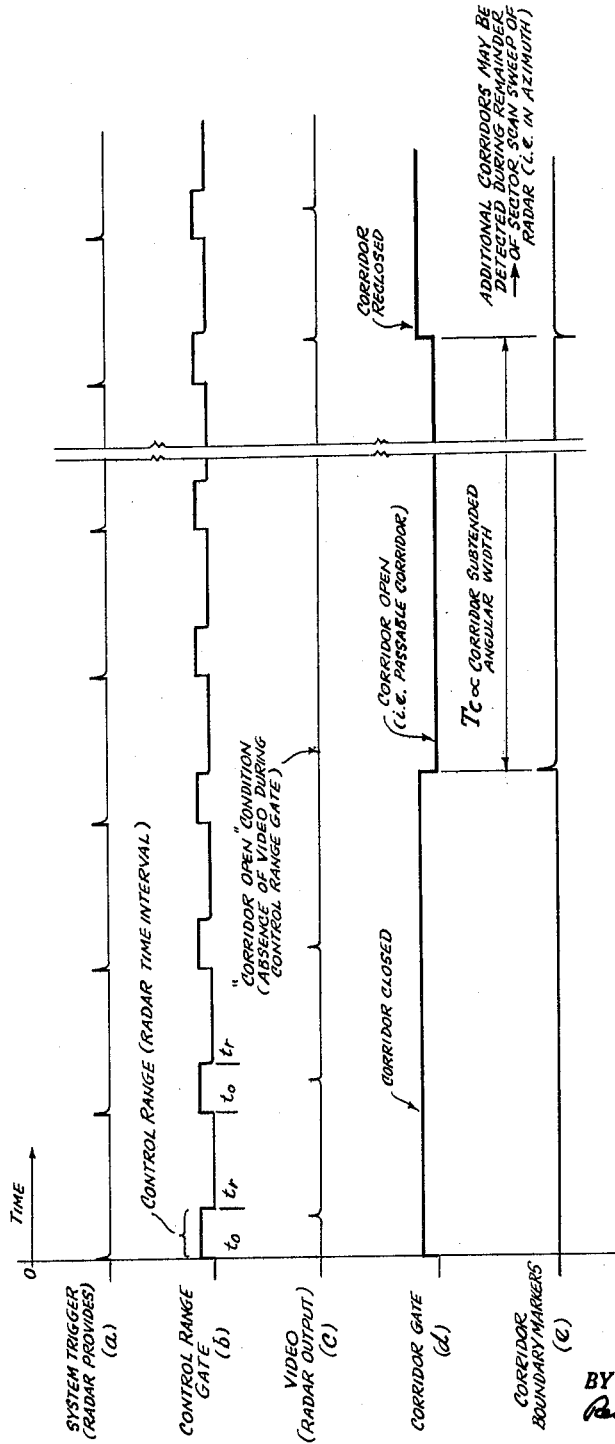
FIGURE 2 is a wave diagram illustrating the manner of generating corridor gates.

The illustrations in FIGURES 1 through 6 will serve to provide a generalized understanding of the nature and functioning of the disclosed embodiment. In this example, obstacle detection from which open corridors may be determined is accomplished with a terrain avoidance radar 10 which may be of any suitable or known type, such as is disclosed in U.S. Patent No. 2,630,283 dated March 3, 1953 of Henry L. Hanson entitled "Automatic Terrain Clearance Apparatus." This radar executes cyclic sector scan in the region ahead of the aircraft. The scan angle typically is of the order of ninety degrees, although it may be larger or smaller than this figure. It is not necessary that the scan angle include and extend beyond respectively opposite sides of the line of relative bearing from the aircraft to point of destination. Should bearing to point of destination lie beyond the scanned sector, a bearing-to-destination function generator 14 produces a false bearing to destination signal at or just inside the adjacent scan angle limit. Such a signal is sufficiently meaningful in that it affords information of the sense of the error of present heading in relation to optimum heading. As the invention is understood, it will be appreciated that other forms of radars and other forms of obstacle detectors, such as sonars, infrared detection systems, and still others may be used in conjunction with the navigation system. Either a "clearance plane" terrain avoidance radar or an "on-boresight cross scan" terrain avoidance radar is suitable. In the "on-boresight cross scan" radar the output video signal represents return from obstructions that extend to, or through, the elevation flight vector. In "clearance plane" radar, the warning video represents return from obstructions that extend to, or through, an adjustable clearance plane that is oriented parallel to and at some selectable distance below, the elevation flight vector. In all preferred embodiments, recurrent or cyclic scanning of the forward region to an outer range limit is necessary.

The aircraft or other vehicle also includes a navigation computer 12. In this instance, its output 12a represents rotated position of a shaft converted into a voltage analog by a bearing to destination function generator 14. The latter provides an output 14a delivered to optimum course selector 16. Navigation computer 12 is operatively associated with or incorporates a directional reference such as a magnetic compass (not shown) and computer means of a suitable or well known type for determining instantaneous bearing to the point of destination on the basis of ground track integration, and for relating such bearing to relative bearing by taking into consideration instantaneous aircraft heading. The navigation computer 12 may include a conventional automatic direction finder (ADF), for example. Steering indications or steering command signals generated by this system on the basis of output from the navigation computer are thereby provided in terms usable directly in the steering system.

Radar 10 provides three outputs to the composite steering command system, (1) the video signals through channel 18, (2) system (i.e., transmitter) triggers through channel 20, and (3) antenna shaft position through coupling 22. Video signals and system triggers are applied to corridor generator 24, whereas antenna shaft position is applied to antenna position function generator 26. The latter converts shaft position into a related direct voltage applied through channel 28 to optimum course selector 16. Antenna position function generator 26 also converts antenna shaft position into sector scan limit marker pulses or resets at the respective clockwise and counterclockwise scan limits. These are in the form of brief impulses applied through channels 30 and 32 to the optimum course selector 16 and also to corridor generator 24. The latter delivers corridor gates or signals through channel 24a to optimum course selector 16 which is cyclically operated through recurrent applications of the system trigger over channel 34 in order thereby to compare the position of passable corridors as represented by the corridor gates with instantaneous bearing to point of destination. On the basis of this comparison, the steering command generator 36 is operated. Its output signal is transmitted through channel 38 to a steering command meter 40 and/ or to an autopilot system 42, as designated by broken line 44. Pitch commands from the terrain avoidance radar 10 are fed to the autopilot through channel 46 such that obstacles unavoidable by azimuth maneuvering will be avoided by pitch maneuvering in the well known manner. Autopilot signals through channel 48 may also be applied back to the navigation computer 12 to provide information from which integrated ground track, hence instantaneous aircraft position, may be determined.

In FIGURE 2a the radar system trigger pulses are shown on a time scale, and in graph 2b, the control range (i.e., radar time interval) gates. These gates are triggered at time $t_0$ and terminate at time time $t_r$, representing the outer range limit of the region scanned (i.e., probed for corridors) by the radar. In graph 2c, radar output video signals are depicted, representing echo returns from a navigation obstacle. These may occur during the control range gate (i.e., between times $t_0$ and $t_r$) or beyond that gate (i.e., after $t_r$). As long as video signals occur within the control range gate on each transmitted pulse cycle of the radar, the system determines that the corridor is closed in the relative direction along which the radar antenna is then pointing. As the antenna continues its sector scan motion, there may or may not be a cessation of video signals during the range gate periods. If not, the system determines that no open corridor is presented, with consequent action to be described hereinafter. On the other hand, if at a given point during the antenna scan the radar transmitted pulse is not returned by an obstacle in the range gate period, an open corridor gate will be generated as shown by graph 2d. This open or passable corridor gate is terminated later in the antenna scan cycle when and if, on a radar transmission cycle, an echo pulse is received during the period of the control range gate. Corridor buondary markers are generated by differentiating the ends of the corridor gate, as shown by graph 2e, and the time interval between these markers $T_c$ becomes proportional to the subtended angular width of the open corridor as measured by angular scan displacement of the antenna in the interval between these markers. One or more open corridor gates may be generated during sweep of the antenna from one scan limit to the opposite limit.

Figure 3:
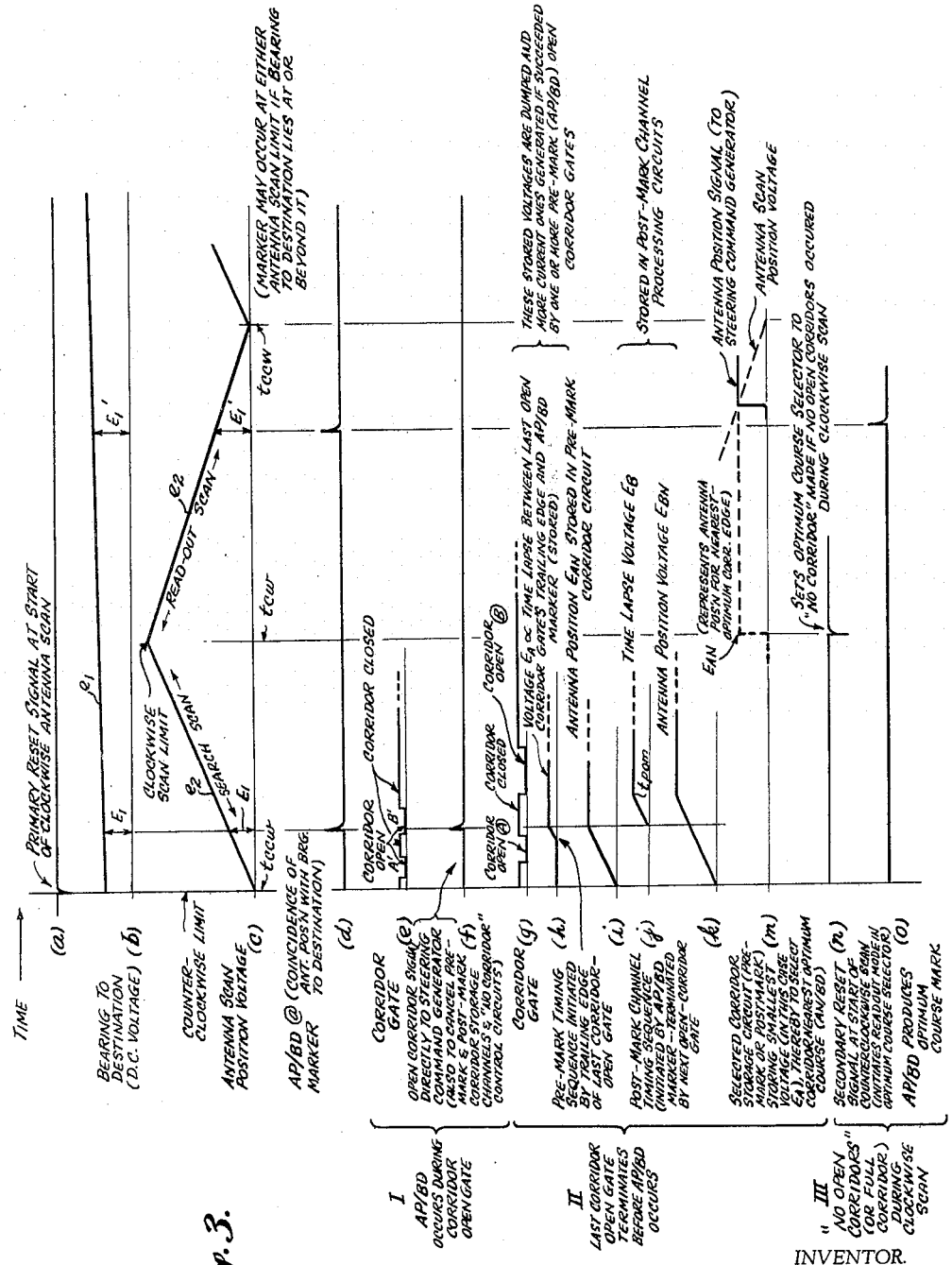
FIGURE 3 is a wave diagram on a reduced time scale showing certain voltage functions occurring the system.

In the illustrated embodiment the return sweep of the antenna is utilized in performing a read-out function by which stored information of the presence and location of open corridors in relation to the bearing to destination point of the aircraft are accepted by logic circuits which generate steering command signals. At the inception of the search scan (i.e., when the antenna is in its counterclockwisemost position, for example) all circuits in the system are cleared preparatory to receiving information. At the termination of this search scan cycle, or inception of the read-out scan cycle, when the antenna sweeps in the reverse path to the point of beginning, a secondary reset marker is generated preparing the system for the read-out function. FIGURE 3, graph a, depicts the primary reset signal which is generated by positioning of the antenna at the counterclockwisemost limit (it could be clockwise) for conditioning the circuits to the "ready" condition. In graph b the variable direct voltage $e_1$ representing the analog of bearing to destination (i.e., the output of bearing to destination function generator 14) is depicted. In graph c of FIGURE 3 a similar analog voltage $e_2$ representing antenna scan position is shown which is at the same scale as the voltage $e_1$. Because of the common scale reference of these two analog voltages a marker signal, referred to as AP/BD (i.e., antenna position coinciding with bearing to destination) marker is generated when the point of cross-over is reached (i.e., when instantaneous antenna position corresponds to instantaneous relative bearing to destination).

During the search scan corridor gates generated by the system appear as in graph e, FIGURE 3. For purposes of illsutration, two such gates A' and B' are depicted, one of which (B') coincides with the AP/BD marker, thereby indicating that a corridor is open in the direction of bearing to destination. Under this specific condition the AP/BD marker is chosen as the optimum course and a signal denoting this choice is passed immediately to the steering command generator, as indicated in graph $f$, FIGURE 3.

On the other hand, if the corridor gate is closed at the occurrence of the AP/BD marker, such marker terminates a pre-mark timing sequence initiated by the trailing edge of the last detected open corridor gate. For example, in graph $g$ termination of open corridor gate A initiates the pre-mark timing sequence shown in graph $h$. This sequence entails generation of a linearly changing voltage terminated at a value $e_A$, with the AP/BD marker. The value $e_A$ is therefore proportional to the time lapse between the termination corridor gate A and said marker. Voltage value $e_A$ is stored in the pre-mark corridor channel. Also stored in this channel is a voltage $e_{AN}$ which is proportional to antenna position at this time of tremination of the trailing edge of corridor gate A. Thus, graph $i$ shows the manner of deriving voltage $e_{AN}$ by first deriving an analog voltage which varies with antenna position and then sampling and storing the sampled value of that analog at the instant mentioned.

If the AP/BD marker occurs during a closed corridor condition, a post-mark timing sequence is also involved. Its purpose is to measure and store a voltage $e_B$ proportional to time lapse between the AP/BD marker and occurrence of the first open corridor gate thereafter (see FIGURE $3j$), and to measure and store a voltage $e_{BN}$ proportional to antenna position at the initiation of this post-mark open corridor gate (see graph $k$). While these voltages are stored in a post-mark corridor channel, the antenna continues its scanning motion to the opposite scan limit, which in this case is the clockwise limit (graph $c$). At this limit a secondary reset signal is generated as indicated in graph $n$, thereby initiating the "read-out" mode.

In the event no open corridor gates were initiated during the search scan phase, that is during the clockwise scan of the antenna, the system is conditioned to the "no corridor" mode and the AP/BD marker, which occurs (graph $o$, FIGURE 3) at the instant of coincidence or crossover of antenna position analog voltage and bearing to destination voltage (graphs $c$ and $b$), is then selected to designate optimium course. However, if, during the clockwise scan, there were open corridors, yet none coincident with the AP/BD marker, the stored voltages in the pre-mark and post-mark channels are used to select optimum course. The channel which stores the smaller of the two voltages $e_A$ and $e_B$ represents the channel whose open corridor (i.e., pre-mark or post-mark) is nearest to the optimum course designated by the AP/BD marker. The associated antenna position voltage corresponding thereto (i.e., voltage $e_{AN}$ or voltage $e_{BN}$ is then compared with instantaneous antenna position voltage $e_2$ (graph $c$). When the two are coincident in value (FIGURE 3, graph $m$) antenna position is instantly detected and is passed to the steering command generator as the commanded course.

FIGURES 4, 5 and 6 illustrate representative siituations which may arise in operation of the system. In FIGURE 4 the airplane or other vehicle is located at point O and is moving along an instantaneous ground track shown by the arrow. It is assumed for convenience that there is no cross wind and that the airplane heading coincides with ground track. Thus, ground track bisects radar scan sector. Point of destination is shown at D. Open corridors are indicated at A' and B'. Under these conditions it is obvious that optimum course extends directly to point D through open corridor B'.

In situation 2 shown in FIGURE 5, corridors A and B lie on respectively opposite sides of the line of bearing to point of destination. Corridor A lies nearest to this line and for this reason the corrected command course shown by the vector passes through corridor A. In the generalized description applied to FIGURE 3, this is the situation represented in graphs $g$, $h$, $i$, $j$ and $k$. Alternatively, as shown by dotted lines in FIGURE 5, the post-mark corridor could be located nearer to the line of bearing to destination than the pre-mark corridor, in which case corridor B would be selected.

At this point it should be noted that only the last open corridor (designated A) occurring before the AP/BD marker is considered in operation of the system. If open corridors occur during the clockwise scan preceding the last corridor, they are rejected by occurrence of the last corridor. Each open corridor occurring during the pre-mark period results in storage of information as well as in termination of stored information resulting from corridors preceding it.

In FIGURE 6 still a third situation is depicted, namely, one in which no corridors are open. In such event, bearing to destination is selected as the optimum course. The same selection is made, of course, in the event the entire scan region is open to navigation.

The steering command generator to be described accepts optimum course signals from the optimum course selector and generates steering command signals which are related to the angular difference between aircraft ground track (center reference for the radar antenna scan pattern) and true optimum course as determined by the optimum course selector. The resulting command is either in terms of a signal capable of operating a course indicator or in terms of a signal capable of operating the autopilot or other navigational unit. The illustrated embodiment will now be described in greater detail by reference to FIGURES 7 through 12.

Figure 7:
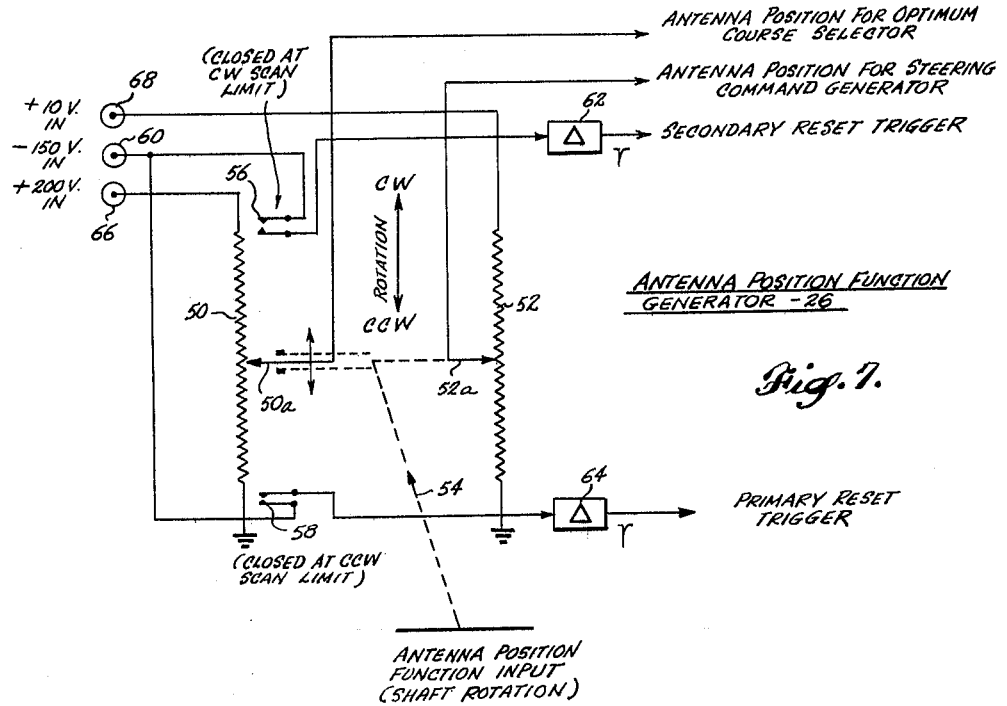
FIGURE 7 is a circuit diagram of an antenna position function generator used in the system.

As shown in FIGURE 7 the antenna position function generator 26 comprises potentiometers 50 and 52 having wipers 50a and 52a ganged together mechanically and reciprocated back and forth with antenna movement by the mechanical connection 54. Limit switches 56 and 58 are closed mechanically at the respective clockwise and counterclockwise limits of antenna scan. One contact of switch 56 is connected to a negative voltage terminal 60 and its other contact is connected to the input of a differentiating network 62. Similarly, one contact of switch 58 is connected to the voltage terminal 60 and its opposite contact to the input of differentiator 64. The negative step voltages applied by the respective switch 56 and 58 to the differentiating circuits are converted into short trigger pulses as desired. The output of differentiator 62 provides the secondary reset trigger and the output of differentiator 64 provides the primary reset trigger. These differentiating circuits may comprise simple R-C differentiators of well known form.

The winding of potentiometer 50 is connected between ground and a positive voltage terminal 66, while the winding of potentiometer 52 is connected between ground and a positive voltage terminal 68 of lower voltage than terminal 66. The output of potentiometer 50, derived by wiper 50a, represents the analog of antenna position supplied to the optimum course selector. The output of potentiometer 52 derived by wiper 52a also represents the voltage analog of antenna position but is at a voltage level suitable for application to the steering command generator.

Figure 8:
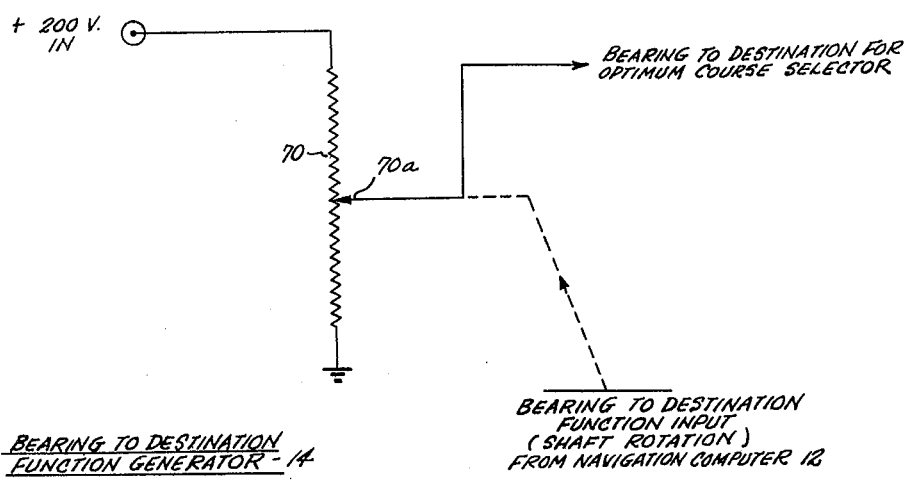
FIGURE 8 is a circuit diagram of a bearing to destination function generator.

Bearing to destination function generator 14 is shown in FIGURE 8. This device consists simply of a single potentiometer 70 having a wiper 70a mechanically driven by rotation of a shaft in the navigation computer 12. The output from the wiper 70a is the voltage analog of bearing to destination and is applied to the optimum course selector.

Figure 9:
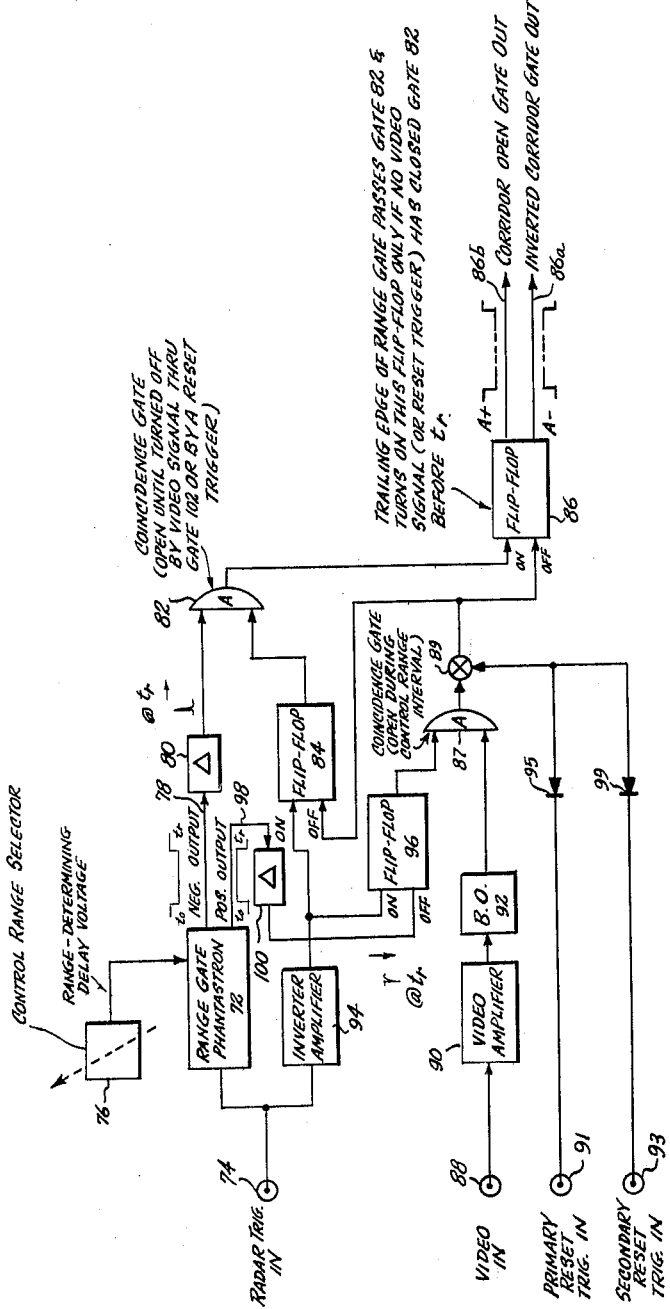
FIGURE 9 is a block diagram of circuit apparatus for generating corridor gates.

Corridor generator 24 as shown in FIGURE 9 is arranged to function in conjunction with a radar of the type in which absence of video output during a given range interval following pulse transmission represents a passable corridor in the instantaneous direction of the radar antenna. In this generator circuit, range gate phantastron 72 (i.e., voltage controlled triggerable gate generating circuit) is triggered with each transmitted pulse from the radar by connection to the radar trigger input terminal 74. The range gate duration is set manually (it may be set automatically, as in accordance with airplane speed) in accordance with a range determining delay voltage applied from source 76 in the well known manner to the phantastron control terminal. The resultant control gate delivered at output conductor 78 determines the outer range limit of the region being scanned for detectable open corridors. The control gate thus applied to differentiating circuit 80 is of negative polarity and its trailing edge is differentiated to produce a trigger pulse $t_r$ applied to the driving terminal of coincidence gate circuit 82. This impulse will pass the coincidence circuit 82 if the flip-flop circuit 84 is in the "on" condition at the time and the resultant output from gate circuit 82 will turn on the flip-flop circuit 86 to initiate an open corridor gate or voltage wave, which is delivered with positive polarity through lead 86a and with negative polarity through lead 86b. As previously mentioned, such a corridor gate will be generated only if the control gate from phantastron 72 runs its course without video signals being received from the radar.

Video signals from the output of the radar are applied to input terminal 88 which is connected to video amplifier 90. The output of amplifier 90, representing any echo pulses from the radar at amplifier level fires the blocking oscillator 92 with each individual echo pulse.

The radar trigger also passes through inverter amplifier 94 and turns on both of the flip-flop circuits 84 and 96. Flip-flop 96 is turned off by the differentiated trailing edge pulse from the positive output lead 98 of phantastron 72 passed through differentiator 100. Flip-flop 96 controls coincidence gate circuit 87, which is thereby biased to the open condition only during the control range gate interval. Thus, coincidence gate 87 passes through the sharpened echo signals delivered by blocking oscillator 92 only if they occur during the control gate interval. If such a signal does pass the coincidence gate circuit 87, it passes through mixer 89 to flip-flop 84 and turns off the latter. This it must do prior to termination of the control range gate if at all, thereby preventing triggering of flip-flop 86 to the "on" condition by the differentiated trailing edge of the control gate as previously described.

Primary reset trigger applied to terminal 91 and secondary reset trigger applied to terminal 93 pass through unidirectional diodes 95 and 99, respectively, to the mixer 89 and turn off the flip-flops 84 and 86 at the scan limits of the radar antenna. Thus, the circuits are placed in the "ready" condition by the reset triggers. As the radar antenna moves away from its scan limit on the search scan, flip-flops 84 and 96 are turned on by each radar trigger. Flip-flop 96 will be turned off by the trailing edge of the control gate from phantastron 72. However, if video is received from the radar during the control gate interval (indicating the presence of an obstruction in the instantaneous direction of radar transmission), coincidence gate circuit 87 will produce an output. The output from this circuit turns off flip-flop 84, closing coincidence gate circuit 82. Thus, the trailing edge marker from differentiating circuit 80 cannot pass through the gate circuit 82 and the flip-flop 86 will not be turned on to produce an open corridor gate. If video is not received prior to the end of the control gate from phantastron 72, flip-flop 84 will remain on for the entire radar pulse cycle. Gate circuit 82 remains open, and the output of this circuit turns on flip-flop 86, indicating the beginning of an open corridor. When the radar antenna once again scans to a position in which video is received prior to the end of the control gate from phantastron 72 (indicating the end of the open corridor—that is, its opposite angular limit), gate circuit 87 produces an output, turning off both flip-flops 84 and 86. The trailing edge marker from network 80 is not passed by coincidence circuit 82, and flip-flop 86 remains off until the radar system once again detects an open corridor condition.

The outputs of the corridor generator 24 are two square waves. One of these, the corridor gate as such, remains negative during the time the detecting radar senses safe navigating conditions in the portion of scan sector being covered by the radar. It goes positive at all other times. The inverted corridor gate is 180 degrees out of phase with the corridor gate.

Figure 10:
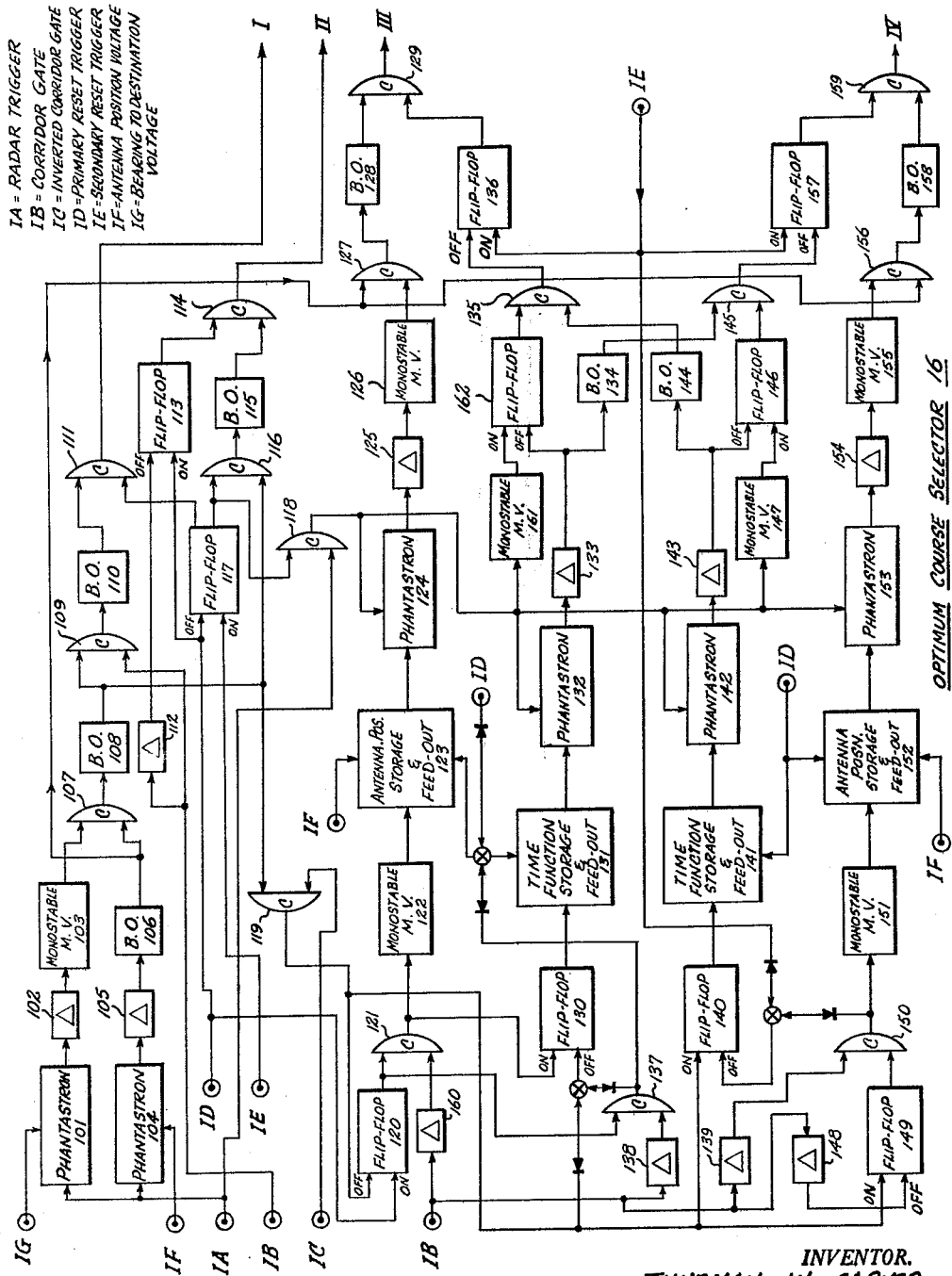
FIGURE 10 is a block diagram of the optimum course selector portion of the total navigation system.
Figure 11:
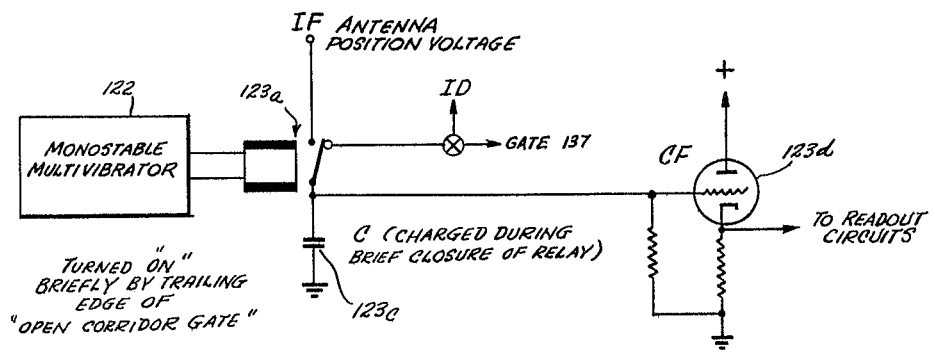
FIGURE 11 is a schematic diagram of a circuit for storing and delivering a voltage function of antenna position.

FIGURE 10 comprises a detailed block diagram of the optimum course selector. This apparatus performs certain logic functions in response to information and signals from the antenna position function generator, the corridor generator, the radar system trigger, the bearing to destination function generator, and the reset triggers, all as previously described with reference to FIGURE 1 et seq.

The logic cycle is initiated when the radar antenna scans to the maximum counterclockwise position. The primary reset trigger from the antenna position function generator (FIGURE 1) is applied at all inputs labeled "ID." This trigger turns on flip-flops 113 and 120, and it turns off flip-flop 117. In addition it "dumps" or eradicates all memorized information that has previously been stored in circuits 123, 131, 141 and 152.

The radar trigger, supplied by external equipment, is applied to input IA at all times. Each applied trigger fires phantastrons 101 and 104. The trigger is also coupled to coincidence gate 118. However, this gate produces an output only when flip-flop 117 is in the "on" condition.

Bearing to destination potential from the bearing to destination function generator 14 is applied as a delay voltage to the control input of phantastron 101. The output of phantastron 101 is a square wave, the duration of which is directly proportional to the control voltage input. Differentiating network 102 produces a marker pulse at the trailing edge of the output square wave from phantastron 101. The time relationship between this marker pulse and the radar trigger is therefore directly proportional to the bearing to destination function. The marker pulse is used to trigger monostable multivibrator 103, and the output of this circuit (a square wave of short duration) is used to open coincidence gate 107.

Phantastron 104 is identical to phantastron 101. However, its delay control voltage is the antenna position potential from the antenna position function generator 26. Differentiating network 105 generates a marker pulse at the trailing edge of the phantastron output wave. This marker pulse is delayed from the radar trigger by a controlled time period directly proportional to antenna scan position, and is used to trigger blocking oscillator 106. The output of blocking oscillator 106 is applied to coincidence gate 107. This coincidence gate produces an output only when the square wave from monostable multivibrator 103 and the pulse from blocking oscillator 106 occurs simultaneously. Therefore, an output from gate 107 represents a coincidence between antenna position and bearing to destination. This output has been referred to previously as the *AP/BD* marker.

The *AP/BD* marker from gate 107 is inverted and reduced in impedance by blocking oscillator 108. The output of blocking oscillator 108 (a voltage spike) is distributed to the inputs of three separate coincidence gates: 109, 116, and 119. Coincidence gate 109 is controlled by the corridor gate signal received through input IB from corridor generator 24. When a corridor is present (that is, the gate generator flip-flop of the corridor generator is "on"), coincidence gate 109 will produce an output upon application of the *AP/BD* marker pulse. This output is then inverted by blocking oscillator 110 and applied to the input of coincidence gate 111. Coincidence gate 111 is controlled by flip-flop 117, the reverse scan cycle generator. Flip-flop 117 is turned off by the primary reset trigger and turned on by the secondary reset trigger. All gates controlled by this flip-flop pass signals only during the reverse (counterclockwise) scan of the radar antenna. Therefore, a signal appears at the output only when a corridor is present during the *AP/BD* coincidence marking during the read-out scan of the radar antenna.

The *AP/BD* marker output of blocking oscillator 108 is also coupled to the input of coincidence gate 116. This gate is also controlled by flip-flop 117. During the read-out portion (i.e., counterclockwise scan) of the radar antenna scan cycle, gate 116 produces an output upon application of the *AP/BD* marker pulse. This output is inverted and amplified by blocking oscillator 115. The output of this blocking oscillator is applied to coincidence gate 114. Gate 114 is controlled by the "no-corridor detector" flip-flop 113. This flip-flop is turned on by the primary reset trigger. The corridor gate from input IB is applied to differentiating network 112, and the output of this network (a pulse representing the leading edge of the applied corridor) is used to turn off flip-flop 113. Therefore, if no corridor is detected at any point within the antenna scan coverage, flip-flop 113 will be "on" during the reverse (read-out) scan, and a signal will be passed to output II upon occurrence of the *AP/BD* marker. If one or more corridors are present, flip-flop 113 will be "off," and coincidence gate 114 cannot produce an output.

In order to describe operation of the optimum course selector under conditions in which corridors are present within the radar scan coverage (but not coincident with the *AP/BD* marker pulse), it is necessary once again to start with the primary reset trigger at the maximum counterclockwise scan position of the radar antenna. The primary reset trigger turns on the pre-mark read-in flip-flop 120. This flip-flop is turned off by the *AP/BD* marker pulse received through coincidence gate 119. Gate 119 is driven by the *AP/BD* marker from blocking oscillator 108. It is controlled by the inverted corridor gate signal received from the corridor generator 24 (FIGURE 9) through input IC. (Gate circuit 119 produces an output only when no corridor is present on the *AP/BD* coincidence marker.) Pre-mark read-in flip-flop 120 controls coincidence gate 121. The latter in turn is driven by a pulse corresponding to the trailing edge of the open corridor gate. This pulse is generated by differentiating network 160 from the corridor gate signal received at input IB.

The output of gate 121 is used to fire monostable multivibrator 122, and to turn on flip-flop 130. The output square wave from monostable multivibrator 122 is of sufficient duration to permit storage of the antenna position voltage coupled to antenna position storage and read-out circuit 123 through input IF. Circuit 123 consists of a millisecond mechanical relay 123a, a storage capacitor 123c, and a cathode follower 123d—see FIGURE 11 Relay 123a is closed for the duration of the output square wave of monostable multivibrator 122, and the capacitor 123c is charged to the antenna position potential through the relay contacts. The cathode follower 123d acts as a buffer between the stored potential and the read-out circuits. The output of flip-flop 130 controls a timing R-C network in the time function storage and cathode follower circuit 131 which is substantially identical in circuit configuration to the circuit 123, illustrated in FIGURE 11. Of course, in case of the circuit 131 the bistable flip-flop 130 provides direct control for the mechanical relay; and, since the capacitor does not store a specific value quantity, as does the capacitor 123c in the circuit 123, this capacitor in circuit 131 may be charged at a uniform rate by an internal voltage source, for example, in order to provide a measure of time. The circuit 131 is so similar to circuit 123 that the drawing of another figure like FIGURE 11 would appear to be a duplication and therefore unnecessary. When flip-flop 130 is turned on by the output of gate 121 a timing sequence is initiated through closing of the mechanical relay and charging of the capacitor. This timing sequence continues until flip-flop 130 is terminated by the *AP/BD* marker pulse from gate 119. The resultant time function value at the instant of termination is stored by circuit 131.

Flip-flop 130 can be turned off by either of two signal inputs. The first of these signals is the *AP/BD* marker pulse from gate 119. This signal stops the timing sequence controlled by flip-flop 130, and data stored by circuits 123 and 131 is held for the read-out sequence. The second source of termination signal comes from coincidence gate 137. This gate is driven by the corridor gate leading edge marker pulse from differentiating network 138, and is controlled by pre-mark read-in flip-flop 120. An output from gate 137 also "dumps" all stored information in both circuits 123 and 131.

In summary, gates 121 and 137 are opened by the primary reset trigger, and remain open until closed by the *AP/BD* coincidence marker. The leading edges of all corridor gates received during this interval are used to clear the premark storage circuits, 123 and 131. The trailing edges of all corridor gates are used to store an antenna position signal, and to initiate a timing sequence. The logic is such as to permit updating the stored values with each succeeding corridor gate. The values that are finally stored for read-out are: antenna position at the trailing edge of the corridor nearest (counterclockwise side) the bearing to destination function; and, time (proportional to angular displacement) between final corridor trailing edge and bearing to destination.

Flip-flop 140 controls the post-mark channel timing sequence. It is turned on by the *AP/BD* marker from gate 119 (i.e., when *AP/BD* occurs during corridor "closed" condition). Time function storage and read-out circuit 141 is identical to circuit 131. Flip-Flop 140 may be turned off by either of two different signals. Coincidence gate 150 is driven by the corridor gate leading edge from differentiating network 139, and is controlled by post-mark read-in flip-flop 149. Flip-flop 149 is turned on by the *AP/BD* marker from gate 119. It is turned off by the corridor gate trailing edge marker from differentiating network 148. Thus, the leading edge pulse from any corridor occurring after the *AP/BD* marker (if the *AP/BD* marker occurs with corridor closed) will be passed through gate 150. The output of gate 150 turns off post-mark timing flip-flop 140 and triggers monostable multivibrator 151. Time function storage and read-out circuit 141 stores the time analog generated during the "on" period of flip-flop 140. Monostable multivibrator 151 permits antenna position storage and cathode follower circuit 152 to store the instantaneous antenna position present at input IF. The secondary reset trigger, received from the antenna position function generator through input IE, is applied to flip-flop 140 at the maximum clockwise scan position of the radar antenna. This trigger serves to stop the timing cycle under conditions in which no post-mark corridors exist.

As previously stated in this illustrative embodiment, read-out of data stored in the optimum course selector is accomplished during the counterclockwise scan of the radar antenna. The secondary reset trigger delivered through input terminal IE turns on the flip-flop 117. This flip-flop opens coincidence gates 111, 116, and 118. The secondary reset trigger also turns on flip-flops 136 and 157. These flip-flops open gates 129 and 159, respectively. The radar trigger applied to the input of coincidence gate 118 causes a trigger to appear at the output of this gate, which is applied to phantastrons 124, 132, 142 and 153, and to monostable multivibrators 161 and 147. This output (referred to as a "reverse scan radar trigger") initiates and read-out cycle. The duration of square waves generated by phantastrons 132 and 142 are determined by the stored time functions of circuits 131 and 141, respectively. Phantastrons 132 and 142 are identical. Therefore, the time intervals between the trailing edges of the two square waves, with respect to their respective leading edges, are directly proportional to the angular displacements of the two stored corridors. Monostable multivibrators 161 and 147 are identical, and they serve as time delay devices. They are included to compensate for the residual outputs of the phantastrons 132 and 142 under conditions in which no time function is stored in the control circuit.

Operation of the pre-mark decision circuit as just described is as follows: Phantastron 132 and monostable multivibrator 161 produce a wave of very short duration, and the trailing edge of this square wave turns on flip-flop 162. Flip-flop 162 opens coincidence gate 135. The trailing edge of the wave from phantastron 132 is differentiated by network 133, and is used to turn off flip-flop 162 and to trigger blocking oscillator 134. The output of blocking oscillator 134 drives coincidence gate 145. The reverse scan radar trigger also drives phantastron 142 and monostable multivibrator 147 of the post-mark decision channel. The trailing edge of the output from monostable multivibrator 147 turns on flip-flop 146, which in turn opens coincidence gate 145. The trailing edge of the wave from phantastron 142 is differentiated in network 143, which turns off flip-flop 146, and drives blocking oscillator 144. Blocking oscillator 144 drives coincidence gate 135. Coincidence gate 135 can produce an output only when flip-flop 162 is "on" at the time blocking oscillator 144 fires. Similarly, coincidence gate 145 can produce an output only when flip-flop 146 is "on" at the time blocking oscillator 134 fires. Since flip-flop 162 is "on" only for the duration of the phantastron 132 square wave, and blocking oscillator 144 generates an output at the trailing edge of the square wave from phantastron 147, gate 135 generates an output only when the duration of the wave from phantastron 132 exceeds the duration of that from phantastron 142. Therefore, an output from gate 135 means that the corridor stored in the pre-mark channel should be rejected. By similar operation, an output from gate 145 means that the corridor stored in post-mark channel should be rejected. The output from gate 135 turns off flip-flop 136, and the output from gate 145 turns off flip-flop 157. An output from gate 135 means that there will be no output from gate 145, and vice versa. The conditions of flip-flops 136 and 157 will be determined by the first few radar cycles that occur after the secondary reset trigger.

The reverse scan radar trigger fires phantastron 124 of the pre-mark channel. The duration of the resultant output square wave is determined by the stored antenna position signal from circuit 123. Differentiating network 125 generates a marker at the trailing edge of the output of phantastron 124, and this marker is used to trigger monostable multivibrator 126. The short-duration square wave from monostable multivibrator 126 is used to open coincidence gate 127. Gate 127 is driven by the pulse from blocking oscillator 106, which is related to instantaneous antenna position. Gate 127 produces an output only when the outputs of phantastrons 104 and 124 are of the same duration. This condition occurs when the radar antenna passes through the stored antenna position. The output of gate 127 drives blocking oscillator 128. Blocking oscillator 128 drives coincidence gate 129. Gate 129 produces an output when flip-flop 136 has not been turned off by a reject signal from gate 135. Operation of post-mark channel circuit elements, comprising the phantastron 153, a differentiating circuit 154, a monostable multivibrator 155, a conicidence gate 156, a blocking oscillator 158, and the coincidence gate 159, is identical to the operation of the pre-mark channel counterparts, as described above. Coincidence gate 159 produces an output when the post-mark channel has not been rejected by an output from gate 145. The final output of the optimum corridor selector 16 is a series of trigger pulses that may come from any of the output terminals I, II, III, or IV, depending upon the logic decision that has been made (output can come from only one of the four terminals under a given situation). This series of triggers will occur when the radar antenna passes the selected bearing angle during the counterclockwise scan cycle.

Figure 12:
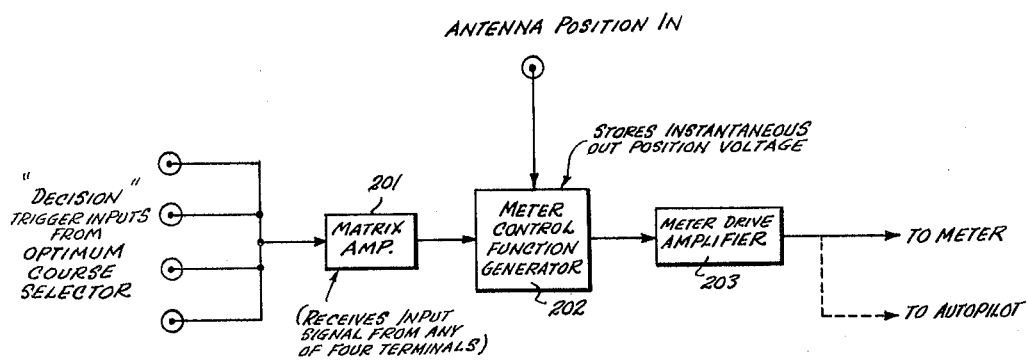
FIGURE 12 is a block diagram of the steering command generator by which steering signals are generated.

A detailed block diagram of the steering command generator appears in FIGURE 12. This circuit contains three basic elements. One is the matrix amplifier 201 which accepts the trigger inputs from each of the four "decision" output terminals I, II, III and IV of optimum course selector 16 (triggers are received from only one input under any given set of conditions). The triggers are amplified and coupled to the meter control function generator 202. This device uses the trigger to initiate storage of the instantaneous antenna position voltage from the antenna position function generator 26. The stored potential is coupled directly to the meter drive amplifier 203. This amplifier drives the command steering indicator (a meter movement) to the position directed by the meter control function generator 202 and may also be used to control autopilot operation as previously explained.

These and other aspects of the invention will be seen from the foregoing description of the presently preferred embodiment thereof.

I claim as my invention:

1. A vehicle navigation-to-destination system comprising means scanning a region ahead of the vehicle to detect relative bearing of passable corridors through said region, electrical means including navigation computer means computing relative bearing to destination, and said electrical means including a corridor selector operatively associated with both said scanning means and said navigation computer means to produce a vehicle steering signal corresponding to the passable corridor nearest bearing to destination.

2. The vehicle navigation system defined in claim 1, including means in the corridor selector responsive to the scanning means operating condition of no passable corridors to produce a vehicle steering signal corresponding to bearing to destination.

3. In a vehicle navigation-to-destination system, means recurringly scanning a region ahead of the vehicle to detect and store information corresponding to relative bearing of passable corridors through said region, electrical means including navigation computer means computing relative bearing to destination, and said electrical means including a corridor selector responsively connected to both said scanning means and said navigation computer means and operable thereby between scans to select the stored information corresponding to the passable corridor nearest bearing to destination.

4. The vehicle navigation system defined in claim 3, wherein said scanning means includes an adjustable range control device establishing the outer range limit of the region scanned.

5. A vehicle navigation-to-destination system comprising an obstacle detection system recurringly scanning a region ahead of the vehicle to detect passable corridors through said region, electrical means substantially continuously comparing instantaneous detection system scan position and bearing to destination of the vehicle, to detect thereby substantial coincidences therebetween, and electrical corridor selector means operatively associated with both said means and the detection system to produce a vehicle steering signal corresponding to bearing to destination in response to detection of a passable corridor concurrently with one of said coincidences.

6. The vehicle navigation system defined in claim 5, including means operatively associated with the detection system to store the relative bearings of passable corridors detected during one scan by the detection system, means in the corridor selector operable upon completion of the scan to produce a vehicle steering signal corresponding to the passable corridor nearest bearing to destination, and means responsive to detection of a passable corridor concurrently with one of said coincidences to preclude and exclude steering signals other than the vehicle bearing-to-destination steering signal.

7. The vehicle navigation system defined in claim 6, including means in the corridor selector operable in response to storage of bearing information of each succeeding passable corridor preceding the point of said coincidence during a scan to remove stored bearing information of the next preceding corridor, and means in the corridor selector operable to store bearing information of only the first corridor detected succeeding such point of coincidence during completion of said scan.

8. The vehicle navigation system defined in claim 7, wherein the detection system executes back-and-forth scanning motion, the passable corridors are detected only on the forward scan, and the bearings thereof are stored as quantitative values, means comparing instantaneous antenna position during the succeeding backward scan with the stored quantitative bearing value of the corridor nearest bearing to destination, to produce the vehicle steering signal in response to coincidence therebetween.

9. In a vehicle navigation-to-destination system, an obstacle detector recurringly scanning a region ahead of the vehicle to detect passable corridors through said region, means coordinated with said detector producing a quantitative representation of relative scan position thereof, a navigation computer producing a quantitative representation of instantaneous relative bearing to destination of the vehicle, referencing means operatively associated with the first two means producing an electrical coincidence signal from instantaneous correspondence between the two representations, and a corridor selector operatively associated with both the referencing means and the obstacle detector, said corridor selector including means to measure the elapsed time periods between the coincidence signal and detection of the immediately adjacent corridors occurring respectively before and after said coincidence signal, and operatively associated comparator means comparing the relative lengths of said periods for producing a vehicle steering signal corresponding to relative bearing of said immediately adjacent corridors nearest said coincidence signal.

10. The navigation system defined in claim 9, wherein the corridor selector includes first and second scan position storage devices, the first device being responsive to termination of detection of a passable corridor next preceding said coincidence signal to store instantaneous detector scan position and the second device being responsive to initiation of detection of a passable corridor next succeeding said coincidence signal to store instantaneous detector scan position, wherein the elapsed time measuring means includes first and second linear integration circuits, means responsive to the coincidence signal for storing instantaneous output of the first integration circuit and initiating operation of the second integration circuit, means responsive to termination of detection of a passable corridor next preceding said coincidence signal for initiating operation of said first integration circuit, means responsive to initiation of detection of a passable corridor next succeeding said coincidence signal for storing instantaneous output of said second integration circuit, and wherein the comparator means are operatively associated with the storage devices and integration circuits for converting into vehicle steering signal the stored scan position corresponding to the integration circuit having the smallest stored instantaneous output.

11. The navigation system defined in claim 10, wherein the obstacle detector comprises a pulse-echo propagative wave energy scanning system having transmitter and receiver, and corridor detection circuit means including a corridor gate generator having two outputs connected to the corridor detector, a first input energizable to initiate a corridor gate and a second input energizable to terminate the corridor gate, a range gate circuit operated cyclically with the transmitter to generate a range gate thereby of predetermined duration, and detection circuit means gated by the range gate circuit and operatively associated with the receiver and corridor gate generator to energize the latter's first output in response to a completion cycle of the range gate without incidence of receiver output signals, and to energize the corridor gate generator's second output thereafter in response to incidence of receiver output signals during a cycle of such range gate.

12. In a vehicle navigation-to-destination system including an obstacle detector which determines relative bearings of navigable corridors presented to the vehicle, a navigation computer substantially continuously computing relative bearing to the vehicle's destination, and steering computer means operatively associated with both said detector and said navigation computer substantially continuously comparing said latter bearing with said navigable corridor bearings and having therein electrical means responsive to coincidence of any such corridor bearing with destination bearing to produce a vehicle steering signal corresponding to destination bearing.

13. The system defined in claim 12, including corridor selector means in the steering computer responsive to noncoincidence of any such corridor bearing with destination bearing to produce a vehicle steering signal corresponding to the corridor bearing nearest said destination bearing.

14. The system defined in claim 13, wherein the obstacle detector includes a scanning type propagative wave energy system cyclically scanning across a region ahead of the vehicle to a predetermined range limit, and wherein the corridor selector means are operable to store as electrical values detected navigable corridor bearings during a scan and, in cyclical relationship with scanning, to compare such stored values with destination bearing.

15. The system defined in claim 13, wherein the corridor selector includes means operable to detect coincidence of instantaneous scan bearing with destination bearing, and means operatively associated therewith to measure time lapse between termination of detection of the corridor last preceding said coincidence, to measure time lapse between initiation of the corridor next succeeding said coincidence, and to compare such time lapses operatively to select the corridor nearest such coincidence for producing the vehicle steering signal.

16. In a vehicle navigation-to-destination system, the method of determining shortest navigable route to a point of destination comprising the steps of substantially continuously computing bearing to destination, cyclically scanning the region ahead of the vehicle for the presence of navigation obstacles to a predetermined outer range limit, generating a vehicle steering signal corresponding to bearing to destination in cyclical relationship with such scanning, in response to the detected absence of obstacles along the bearing to destination, and generating a vehicle steering signal corresponding to a different bearing in said cyclical relationship in response to detection of obstacles along said bearing to destination.

17. The method defined in claim 16, including the further steps of cyclically comparing the angular extent to respectively opposite sides of such an obstacle from destination bearing, and generating such vehicle steering signal to navigate around the side closest to destination bearing.

18. In a vehicle navigation-to-destination system, the method of determining shortest navigable route to a point of destination comprising the steps of substantially continuously computing bearing to destination, cyclically scanning the region ahead of the vehicle for the presence of navigation obstacles to a predetermined outer range limit, generating a vehicle steering signal corresponding to bearing to destination in cyclical relationship with such scanning in response to the detected absence of obstacles along the bearing to destination, generating a vehicle steering signal corresponding to a different bearing in said cyclical relationship in response to detection of obstacles along said bearing to destination, and generating a vehicle steering signal corresponding to bearing to destination in response to the presence of obstacles throughout the scan region.

19. In a vehicle navigation-to-destination system, the method of determining shortest navigable route to a point of destination comprising the steps of substantially continuously computing bearing to destination, scanning the region ahead of the vehicle for the presence of navigation obstacles to a predetermined outer range limit, generating a vehicle steering signal corresponding to bearing to destination in response to the detected absence of obstacles along the bearing to destination, generating a vehicle steering signal corresponding to a different bearing in response to detection of obstacles along said bearing to destination, and generating a vehicle steering signal corresponding to bearing to destination in response to the presence of obstacles throughout the scan region.

References Cited by the Examiner

UNITED STATES PATENTS

| | | | |
|---|---|---|---|
| 2,539,405 | 1/1951 | Deloraine et al. | 343—108 |
| 2,586,743 | 2/1952 | Thresher et al. | 343—5 |
| 2,630,283 | 3/1953 | Hanson | 343—7 |
| 2,822,536 | 2/1958 | Sandretto | 343—5 |
| 2,957,082 | 10/1960 | Plass | 343—112.4 |
| 3,040,314 | 6/1962 | Hesse | 343—112.4 |

CHESTER L. JUSTUS, *Primary Examiner.*

R. M. SKOLNIK, T. H. TUBBESING,
*Assistant Examiners.*